United States Patent

Luscombe et al.

[11] Patent Number: 5,943,293
[45] Date of Patent: Aug. 24, 1999

[54] SEISMIC STREAMER

[76] Inventors: John Luscombe, 2922 William's Grant, Sugarland, Tex. 77479; Robert M. Braham, 26 Priory Quay, Quay Road, Christchurch, Dorset, United Kingdom, BH23 1DR; Michael L. Maples, 10027 Peach Ridge, Houston, Tex. 77070

[21] Appl. No.: 08/761,780

[22] Filed: Dec. 6, 1996

Related U.S. Application Data

[63] Continuation-in-part of application No. 08/652,978, May 24, 1996, abandoned.

[30] Foreign Application Priority Data

Jun. 20, 1996 [GB] United Kingdom ............... 9610541

[51] Int. Cl.[6] ............................................. G01V 1/38
[52] U.S. Cl. ................................... 367/20; 174/101.5
[58] Field of Search .................. 367/20, 154; 174/101.5

[56] References Cited

U.S. PATENT DOCUMENTS

| | | | |
|---|---|---|---|
| 4,092,629 | 5/1978 | Siems et al. | 367/20 |
| 4,160,229 | 7/1979 | McGough | 367/20 |
| 4,260,211 | 4/1981 | Mollere | 367/20 |
| 4,477,887 | 10/1984 | Berni | 367/20 |
| 4,638,469 | 1/1987 | Bryant et al. | 367/154 |
| 4,694,436 | 9/1987 | Gelfand | 367/20 |
| 4,725,990 | 2/1988 | Zibilich, Jr. | 367/51 |
| 4,821,241 | 4/1989 | Berglund | 367/20 |
| 4,951,265 | 8/1990 | Buckles | 367/18 |
| 5,513,151 | 4/1996 | Morningstar et al. | 367/154 |
| 5,521,885 | 5/1996 | Harvey | 367/154 |

FOREIGN PATENT DOCUMENTS

WO 93/03402  2/1993  WIPO ............... G01V 1/38

*Primary Examiner*—Ian J. Lobo
*Attorney, Agent, or Firm*—Gunn & Associates, P.C.

[57] ABSTRACT

A seismic marine streamer (10) including hydrophones (12) housed in elongate flexible tubes (11), a pair of load carrying rope members (25, 26), and a plurality of spacers (15) which substantially fill the internal cross-section of the tube (11), the internal void within the tube being filled by a liquid, the two rope carrying members (25, 26) interconnect end fittings (21, 22) located one at each end of a tube (11) and passing through each spacer (15) on diametrically opposite sides thereof.

7 Claims, 5 Drawing Sheets

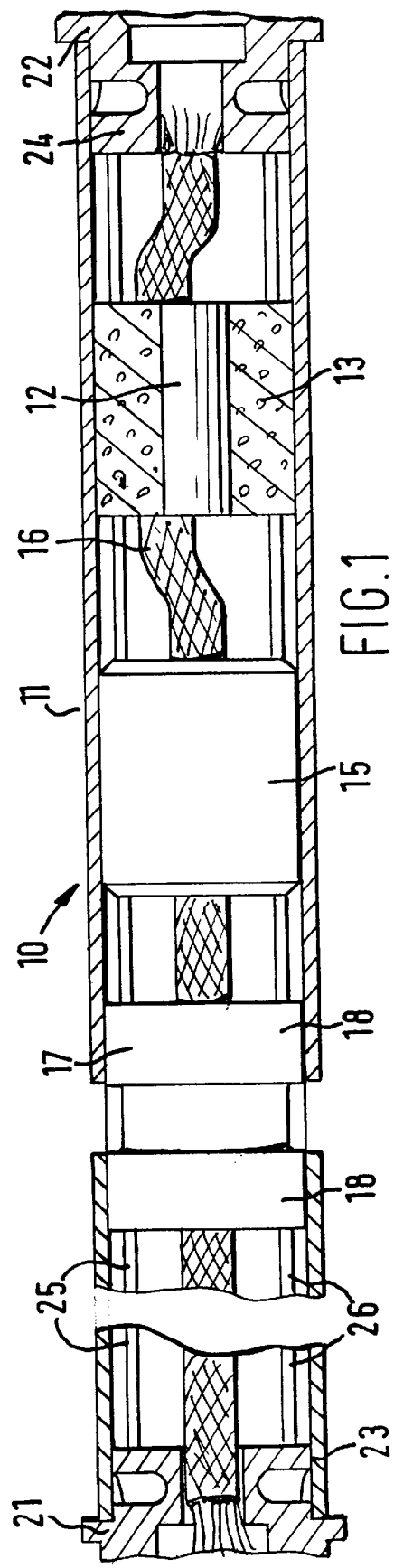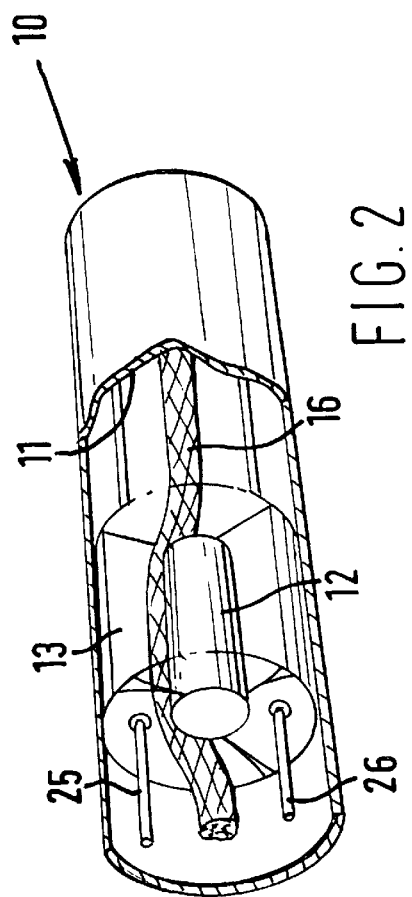

SEISMIC STREAMER

This is a continuation-in-part of U.S. patent application Ser. No. 08/652,978, filed May 24, 1996, abandoned.

FIELD OF THE INVENTION

This invention relates to seismic streamers which are towed through water behind vessels for seismic exploration and for ship or submarine detection.

BACKGROUND OF THE INVENTION

Seismic streamers generally comprise hydrophones which are interconnected by power and data cables and which are housed within long flexible tubes.

A seismic streamer may be up to 6 kilometers in length and therefore is conventionally made up of a large number of sealed elongate modules that are interconnected end to end to make up the streamer. The modules will be connected together through connectors which form end fittings in the modules end which physically secure the modules together and also provide for electrical connections between modules so that data and power can pass freely the length of the streamer. The streamer may also include electronic transmitting apparatus housed in canisters which are located between streamer modules at various stages along the streamer for broadcasting data which is received by the survey vessel.

The length of the streamer and the drag acting thereon as it is towed through the water, necessitates the use of wire or rope load bearing members which typically interconnect the end fittings at opposite ends of a streamer module.

In a typical streamer as shown in U.S. Pat. No. 4,638,469, there are three or four equi-angularly spaced ropes or wires running the length of the module. Alternatively, in U.S. Pat. No. 5,251,182 the ropes are incorporated within the wall of the surrounding tube. A rope or wire member is typically attached to the respective end fitting by means of a cone cast onto the end of the rope or wire, e.g. an epoxy resin cone. The failure point of such an attachment means is unpredictable. Another problem with these types of construction is that the loads in wires or ropes are not evenly distributed as between the wires or ropes when the strand is curved around a storage reel.

A typical streamer module also includes a number of spacers which substantially fill a cross sectional area of the tube. The spacers serve to maintain the internal cross-section of the tube and to keep the rope or wire load-bearing members separated from the power and data cables. The module also contains acoustic units having hydrophones and oil filler blocks. Typically, the streamer is given controlled buoyancy, usually neutral buoyancy by filling the voids within the streamer module by a liquid of a particular density. Paraffinic hydrocarbons have been used for this purpose. For example in U.S. Pat. No. 3,518,677 there is described the use of a gelatinized hydrocarbon having a specific gravity of 0.8 or slightly below.

The disclosure herein provides means for adjusting the buoyancy of a streamer, improved load bearing members, and improved end fitting for the streamer modules.

STATEMENTS OF INVENTION

Accordingly there is provided a seismic marine streamer in which hydrophones are housed in elongate flexible tubes which also house a pair of load carrying rope members which pass through a plurality of spacers which substantially fill the internal cross-section of the tube, the internal void within the tube being filled by a liquid, the two load carrying members passing on diametrically opposite sides of each spacer adjacent the outer peripheral margins thereof and having a nominal diameter of at least 8 mm and a breaking load of at least 14,000 lbs. (6250 Kg).

Preferably, the spacers are each formed from a respective material having a particular relative density, the spacers being distributed along the streamer according to their respective densities to achieve a desired buoyancy characteristic.

The spacers may be formed from a variety of materials, preferably molded plastics having a range of densities of specific gravities from 0.5–1.8 for example; low density materials such as epoxy resin filled with microspheres, polypropylene, HD and LD Polyethylene, and relatively high density materials such as polyurethane resins, acetal resins and phenol formaldehyde molding compounds. In some cases it might be desirable to use brass or bronze spacers.

Preferably, the load bearing rope members are an aromatic polyester material, in particular a liquid crystal polymer fiber which is braided into rope. A typical example is VECTRAN (registered trademark) manufactured by Hoechst Celanese. The rope may be sheathed in a polyester yarn fabric overbraid to prevent snagging on the internal surface of the tube.

Also according to the intention there is provided a seismic marine streamer in which hydrophones are housed in elongate flexible tubes including a pair of load carrying rope members which pass through a plurality of spacers which substantially fill the internal cross-section of the tube, the internal void within the tube being filled by an aqueous medium, for example sea water, fresh water, or a salt solution in particular calcium chloride solution.

Yet another aspect of the present invention provides a connector assembly for sealing the end of a flexible tube of a seismic streamer, the connector assembly having a pair of tube end fittings each with a cylindrical portion with a plurality of cavities therein each of which in use receives a looped end of a rope or wire, and a pin fast with the end fitting is engagable within the loop to secure the end fitting to a respective rope or wire.

Preferable the pin is integral with the respective end fitting.

The loop connection with the pin forms a flexible connection which is extremely reliable and has predictable load carrying capabilities.

The invention also provides a method of trimming the buoyancy of seismic streamer in which hydrophones are housed in elongate flexible tubes having a plurality of spacers which substantially fill the internal cross-section of the tube, the internal void within the tube being filled by a liquid, wherein the spacers are distributed along the streamer according to the respective densities of the materials from which they are formed so as to achieve a desired buoyancy characteristic.

These and other features of the present invention will be apparent to those of skill in the art from a review of the following detailed description along with the accompanying drawings.

BRIEF DESCRIPTION OF DRAWINGS

The invention will be described by way of example and with reference to the accompany drawings in which:

FIG. 1 is schematic cross-section through a streamer module according to the invention;

FIG. 2 is an isometric view of a small portion of the streamer of FIG. 1;

DETAILED DESCRIPTION OF INVENTION

Figure 3:
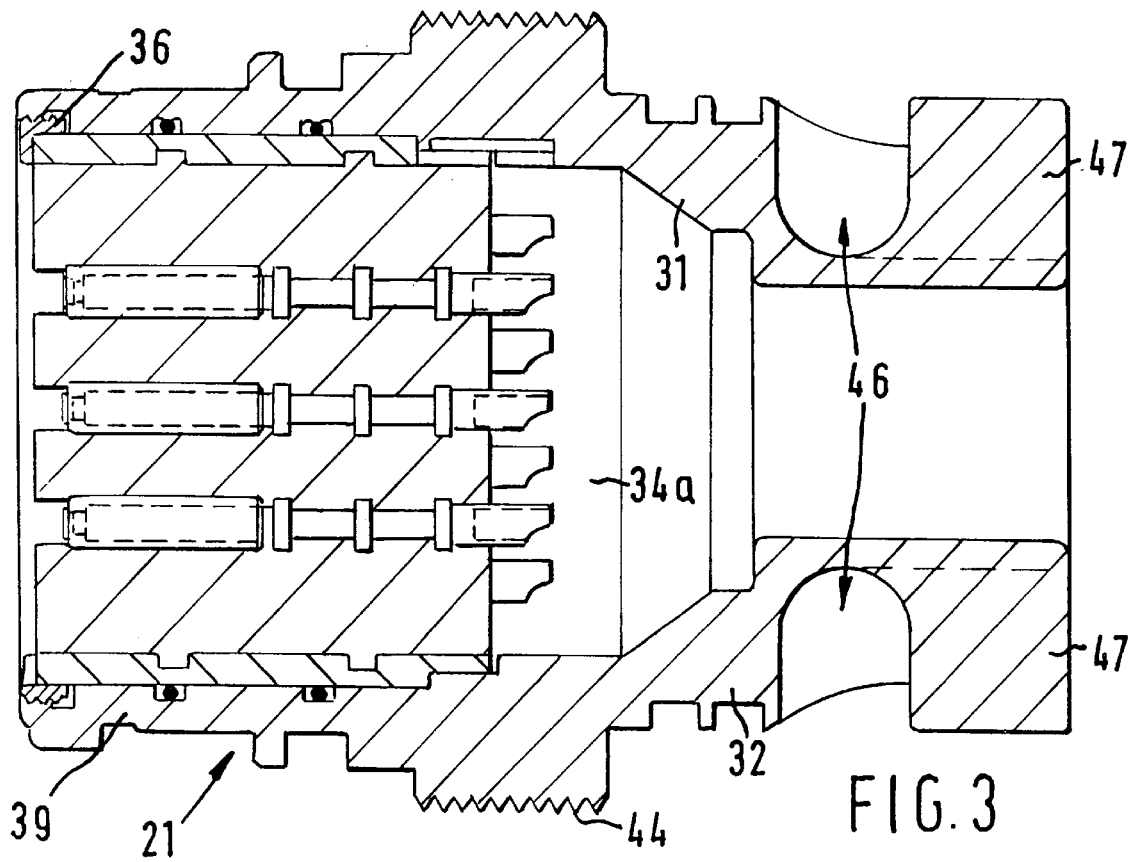
FIG. 3 is a cross-section through an end fitting for a streamer tube forming one member of a connector assembly for interconnecting streamer modules.

The invention will be described in general with reference to FIG. 1 and FIG. 2. There is shown in the drawings a module 10 of a seismic marine streamer. These modules 10 are typically 75–100 meters in length and typically 40 modules may be linked together in a single streamer which is towed behind a ship for seismic exploration of a sea bed or lake bottom.

The streamer module 10 comprises an outer flexible tube 11 about 62 mm in external diameter and 56 mm in internal diameter which is typically formed of a thermoplastic polyurethane, e.g. 1185A ELASTOLLAN (trademark) available from BASF. The tube 11 houses a plurality of hydrophones 12 which are spaced along the module so that there are about eight hydrophones along a six meter length of tube. The hydrophones 12 are preferably waterproof. An example of a suitable hydrophone is the Benthos RDA hydrophone (available from Benthos Inc., North Falmouth, Me., USA). The hydrophones are connected in parallel and are held in the center of the tube by a tubular foam collar 13 or alternatively may be stitched to rope members 25, 26.

A plurality of tubular spacers 15 are located between the hydrophones 12 and are spaced along the length of the tube 11. The spacers 15 substantially fill the cross section of the tube and serve to hold the tube in a circular cross-section. The spacers 15 may also be used as bulkheads dividing each module 10 into separate liquid filled sections.

Each end of the module 10 is closed by an end fitting 21, 22 which forms part of a connector assembly 20. Each end fitting 21 22 has a respective smaller diameter cylindrical portion 23, 24 respectively onto which an end portion 11A of the tube 11 can be swaged so that the end fittings 21, 22 seal the ends of each module. Extending between the two end fittings 21, 22 are a pair of load carrying rope members 25, 26 which take the towing load when the streamer is towed behind a vessel. The rope members 25, 26 are each secured at each end to a respective end fitting 21 or 22 as will be later described.

The hydrophones 12 spaced along each module 10, and the hydrophones 12 in the different modules are interconnected by data-carrying and power-carrying cables 16, so that the end fittings 21, 22 also include means for interconnection of the cables 16 between one module and an adjacent module.

Each module 10 also includes at least two filler blocks 17, located in the tube 11 at a location between the end fittings 21, 22. The tube 11 is swaged onto end portions 18 of the filler block 17. The filler block 17, and spacers 15 serve to keep the load carrying rope members 25, 26 away from the cables 16. The filler block 17 will be later described in detail but includes means whereby the void within the tube may be filled with a liquid of a density so as to provide the module with a neutral buoyancy overall when in sea water or fresh water. In some instances the tube may be filled with an aqueous medium such as calcium chloride solution, or sea-water or is more typically filled with a paraffinic hydrocarbon.

The components within the module will now be described in more detail.

Figure 5:
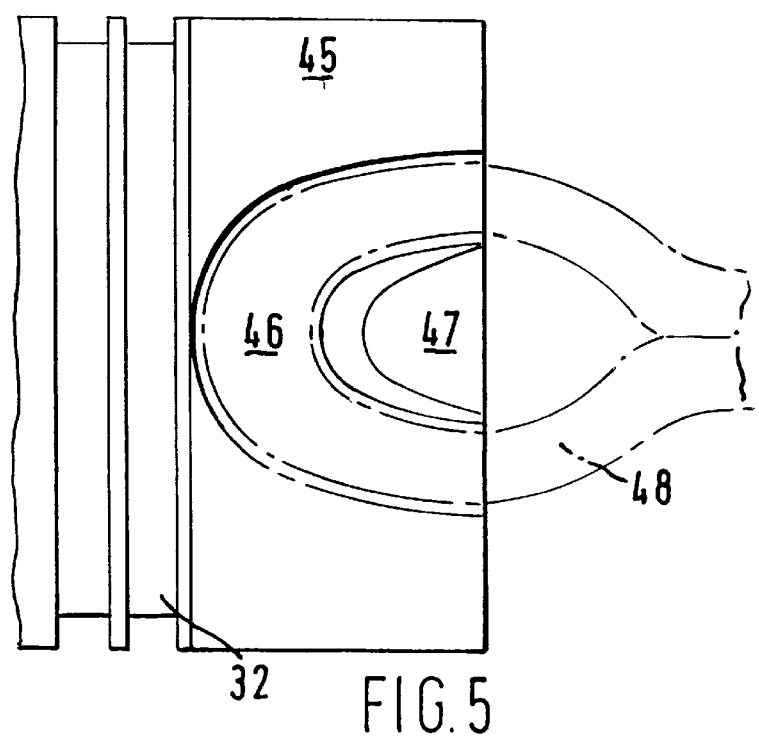
FIG. 5 is view in the direction of arrow A on the inner end of the end fitting of FIG. 3.
Figure 4:
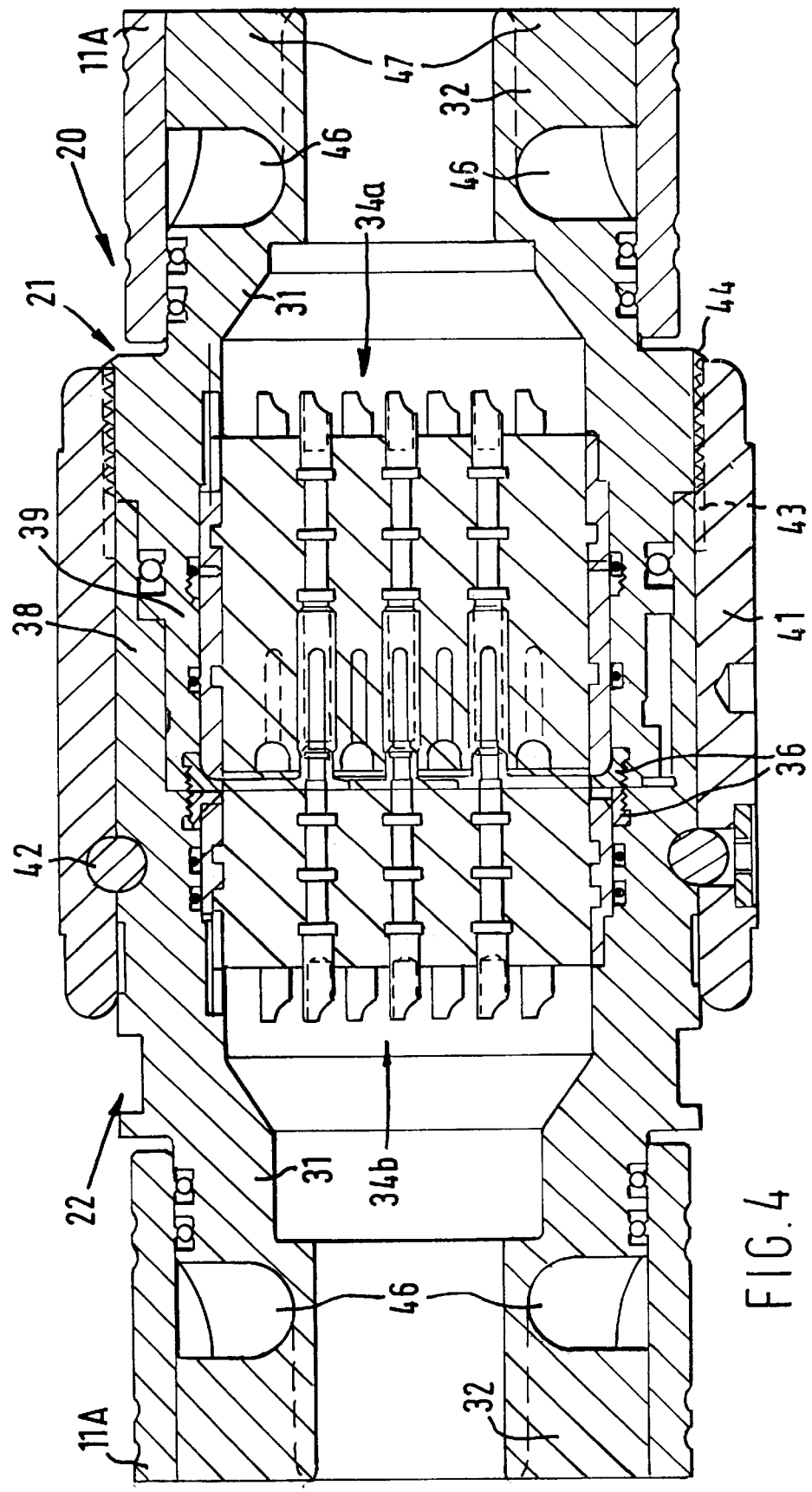
FIG. 4 is a cross section through a connector assembly.

With reference to FIGS. 3–5 there is shown a connector assembly 20 having end fittings 21, 22 which are located in the respective end portions 11a of tubes 11. The end fittings 21 and 22 have a titanium body 31 with a cylindrical inner end portion 32 which is gripped within the end portions 11a of the tube 11. The end fitting bodies 31 each have a hollow interior in which one half of an electrical pin and socket connector assembly 34 is housed. In this example the socket connector block 34a is located in the male end fitting 21 and the pin connector block 34b is located within the female end fitting 22. The pin and socket connectors 34 are for example thirty seven pin connectors which are connected to the individual data and supply cables 16. The connector blocks 34a or 34b are secured within their end fitting bodies 31 and are held in place by screw threaded rings 36.

The female end fitting 22 has an elongate cylindrical housing portion 38 that extends beyond the pin connector block 34b away from the inner end portion 32 and has an inner cylindrical wall which accommodates the nose portion 39 of the male end fitting 21 so that the nose portion 39 is sealingly slidable into the housing portion 38. The two end fittings 21, 22 may be held together by a titanium sleeve 41 which is rotatably fixed to the end fitting 22 by bearings 42 and which has an internal screw threaded portion 43 which engages with a like-threaded external portion 44 on the end fitting 21. The end fittings 21, 22 and alcove 41 form a connector assembly for mechanical and electrical interconnection of streamer modules.

The inner end portion 32 of each end fitting 21, 22 has a substantially cylindrical outer surface 45 over which the end portions 11a of the tube 11 are sealingly attached. The outer cylindrical surface 45 has a pair of diametrically opposite cavities 46 formed therein. Each cavity 46 is in the general form of a 'u' shaped cross sectional channel that extends in a loop to leave an island 47 integral with each end fitting 21, 22 projecting radially thereof. The loop shape of the cavity 46 can accommodate an eye-spliced rope end 48 (shown in dotted outline) so that a pin 47 formed by a respective island 47 can project through the eye of the rope to secure the rope to the respective end fitting.

When the eye spliced loop ends 48 of the two rope members 25, 26 are fixed over the pins 47 and the tube 11 is pushed over the respective end fitting body 31, the tube prevents the radial outward movement of the rope and prevents disengagement from the respective pins 47. Furthermore the 'loop' shape of the cavity 46 allows for some pivotal movement between the rope 25, 26 and the end fitting 21, 22 about an axis formed by the pins 47.

Figure 15:
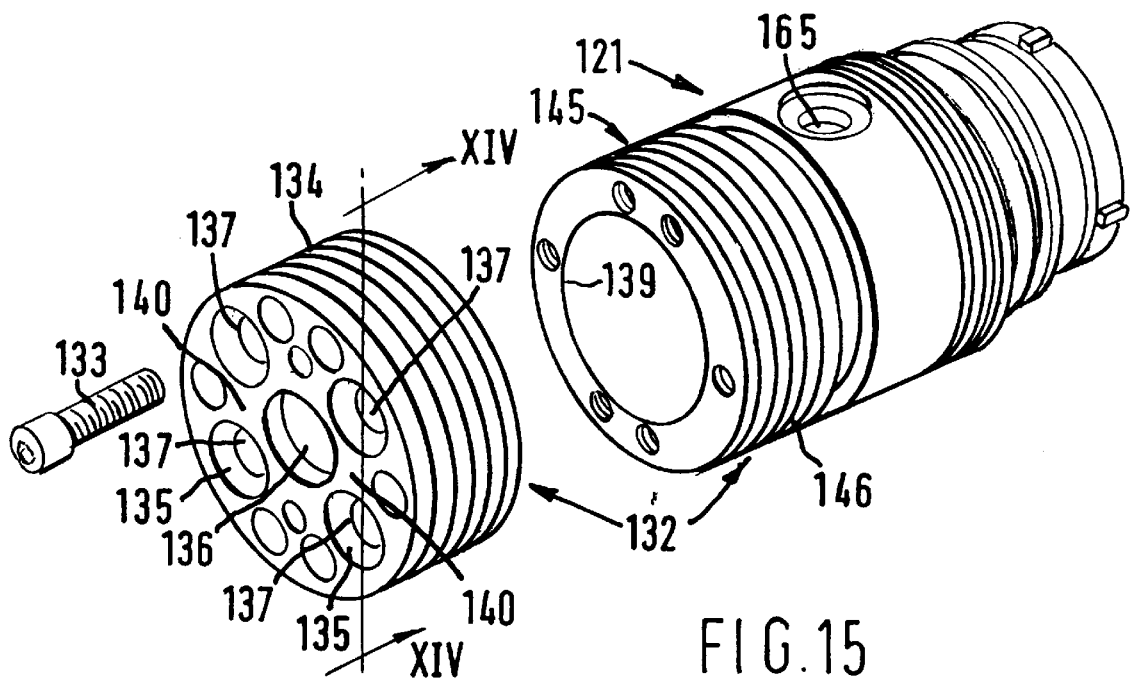
FIG. 15 is an isometric exploded view of the end fitting with its respective retainer plate.

In an alternative embodiment shown in FIG. 15, the rope members 25, 26 are attached to their respective end fittings, only one 121 of which is shown, by means of separable retainer plate 134 forming part of the inner end portion 132 of each end fitting 121. The retainer plate is secured in place by a plurality of bolts 133, preferably six circumferentially spaced bolts only one of which is shown for convenience, which engage threaded holes 139 on the main body of the end fitting 121.

Each retainer plate 134 (also see FIG. 14) has a pair of cavities 135 formed on each side of a central aperture 136 through which the electrical cables pass. The cavities 135 each comprise a pair of bores 137 opening towards the tube 11 which are interconnected at their other ends by a slot 138 opening towards the connector blocks and forming a U-shaped cavity with an integral pin 140 formed between the bores 137.

Figure 14:
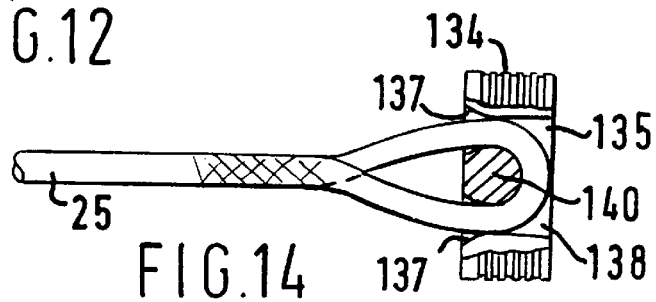
FIG. 14 is a view of the retainer plate of a second-end fitting showing a section on the line XIV—XIV of FIG. 15 with a rope member in-situ.

As can be seen in FIG. 14, a rope member 25 or 26 is passed through one of the bores 137 and around the pin 140 and then passes back on itself through the other bore 137 and is spliced to the rope to form a loop 141. The retainer plate 134 with its ropes attached thereto is secured to the rest of the end fitting by bolts 133 and a tube end portion 11A is then fitted over the assembled inner end portion 132. The external cylindrical surface 145 of the inner end portion 132 has annular grooves 146 formed thereon for attachment of the tube 11. The end fitting 121 also includes an inlet port 165 for filling the tube 11 with liquid.

The two rope members 24, 25 are formed from an aromatic polyester material having liquid crystal polymer phase. An example of this material is VECTRAN manufactured by Hoechst Celanese. The two rope members should each be capable of taking a load of at least 14,000 lbs. and preferably between 18–19,000 lbs. and have a preferred structure of 12 strand single braid rope having at least a nominal 8 mm diameter and preferably a 9 mm diameter. The use of two load carrying members 25, 26 and the provision of the movement between the rope and the end fittings helps to reduce the stresses within a streamer module when the streamer is rolled up for storage on a drum or reel. The spliced loops and pin connectors should each take a load of about 14,000 lbs. The ropes 25, 26 may be covered in a sheath, preferably a polyester fabric braid sheath, to reduce snagging of the braid on the inside of the tube.

Figure 6:
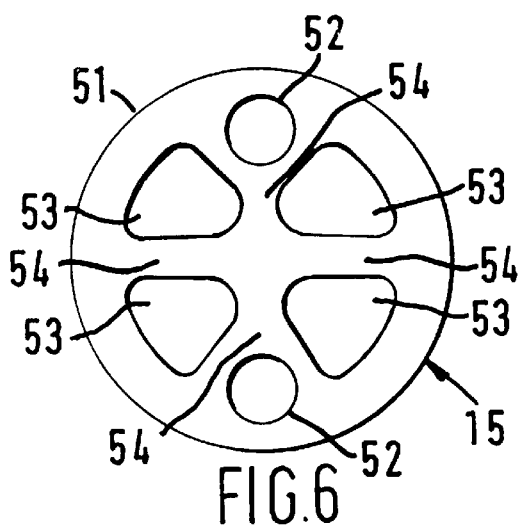
FIG. 6 is an end view of a first spacer used in FIG. 1.
Figure 7:
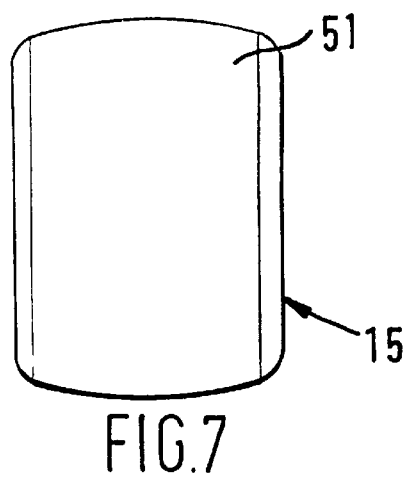
FIG. 7 is a side view of the spacer in FIG. 6.
Figure 8:
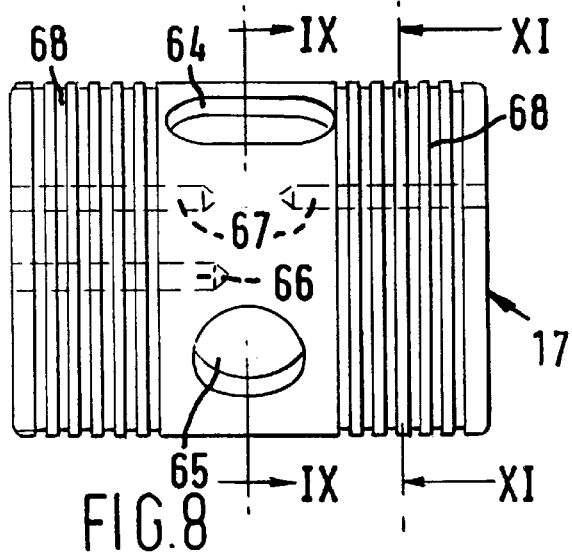
FIG. 8 is a liquid filler used in the streamer of FIG. 1.
Figure 11:
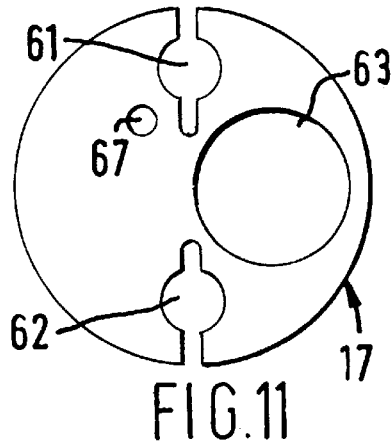
FIG. 11 is a section on the line XI—XI of FIG. 9.
Figure 9:
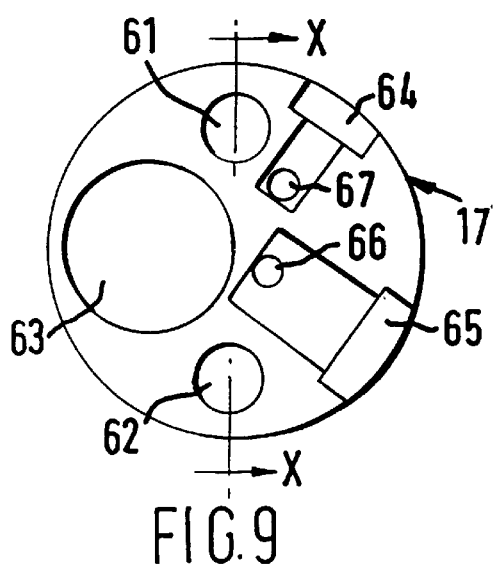
FIG. 9 is a section on the line IX—IX of FIG. 8.
Figure 10:
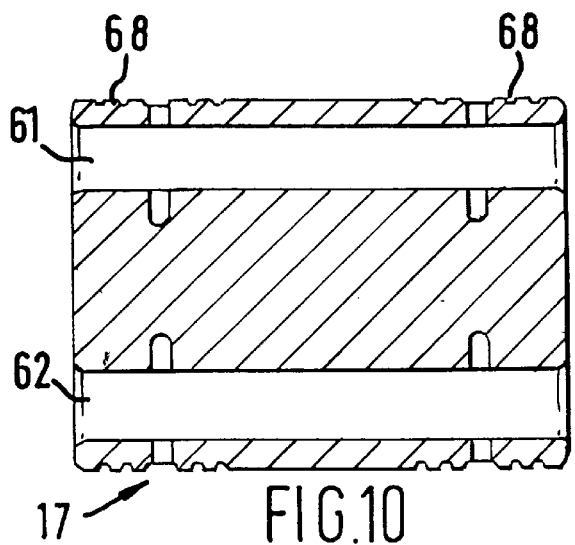
FIG. 10 is a section on the line X—X of FIG. 9.

The spacers 15 are shown in FIGS. 6 and 7 and have substantially barrel shaped bodies 51 which in use will fill the internal cross-section of the tube 11. Each spacer 15 has a pair of diametrically opposite holes 52 to accommodate the rope members 25, 26. The spacers 15 also have four circumferentially spaced apertures 53 located radially inwardly therein, which are spaced apart by radial struts 54. The apertures 53 allow for passage of the cables 16. The spacer 15 has improved radial load carrying capacity because of the cruciform arrangement of struts 54 at its center.

The spacers 15 may also be used to isolate sections of the module 10 by sealing the rope members 25, 26 and cables 16 to the spacer where they pass therethrough, and other apertures not in use being sealed.

The spacers 15 are molded from a plastics material by injection, or compression molding techniques. The spacers are made from material of a variety of specific gravities, so that some spacers may be made of polypropylene having a relative density of 9.89–0.90 and some spacers may be made of polyacetal resin having a density of about 1.45–1.5. Other materials such as polyurethane elastomer having a density of 1.2, or phenolic molding compounds which may have a density of up to 1.8, bronze, brass, or epoxy resin filled with glass microspheres to give a desired density as low as 0.5, could also be used. By having spacers formed of different materials having different densities it is possible to trim the buoyancy of the module 10 by means of the disposition of the spacers, and selection of their material make-up.

Figure 12:
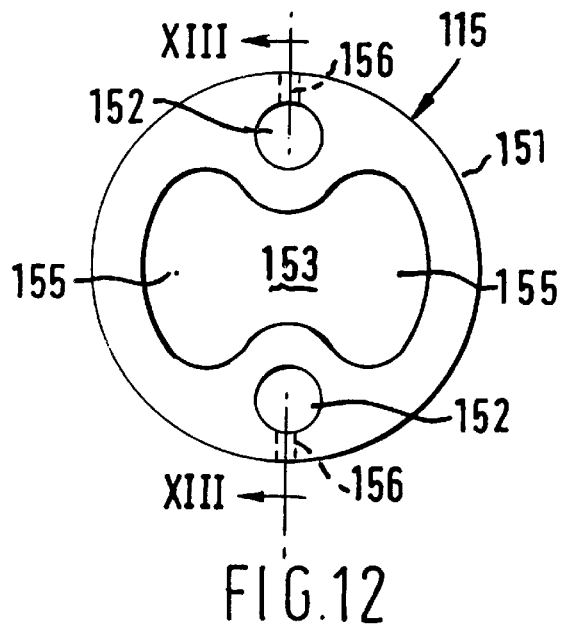
FIG. 12 is a front elevation of a second spacer.
Figure 13:
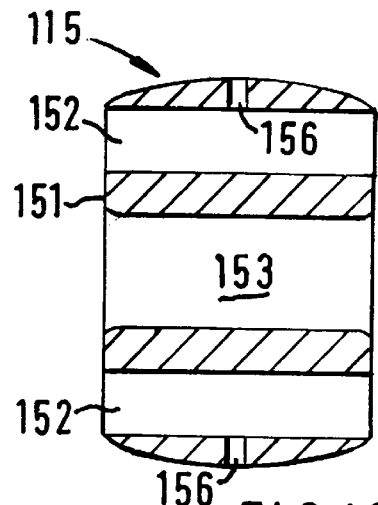
FIG. 13 is a section on the line XIII—XIII of FIG. 12.

An alternative form of the polyurethane space 115 is for example made from ISOPLAST from DuPont and is shown in FIGS. 12 and 13. The polyurethane resin may be a glass filled resin if desired. The spacer 115 has a substantially barrel shaped body 151 as before, with a pair of diametrically opposite holes 152 to accommodate the rope members. The spacer has a large central aperture 153 shaped in the form of a bow tie with the cables 16 passing through the larger portions 155 of the aperture 153. A pair of radial holes 156 are aligned with the axial holes 156 for the ropes. These holes are for injecting adhesive, e.g. an epoxy resin, for securing the spacer to the respective rope member.

The filler block 17 is shown in FIGS. 8 to 11. The block 17 is a substantially cylindrical block formed by molding a plastics material, preferably an acetal resin. Each block has a pair of diametrically opposed longitudinal passageways 61, 62 passing therethrough to accommodate the rope member 25, 26 and an off set larger diameter longitudinal passageway 63 for accommodating passage of the cables 16 therethrough. A radial vent port 64 and a radial inlet port 65 are located at the center of each block 17. The inlet port 65 being connected into the tube by means of an axial passageway 66 and the vent port 64 is connected into the tube by two axial passageways 67. The two ports are provided with sealing caps (not shown) to seal the tube 11 after filling with a low density liquid and venting.

The end portion 18 of the filler block has annular grooves 67 formed on external surface thereof to help retain the tube 11 which is swaged thereon.

The filler block 17 may be formed from materials such as acetal resin, bronze, brass, phenolics, etc. selected for a particular density requirement to assist trim the buoyancy of the module 10.

The cavity within the module 10 is preferably filled with an electrically inert liquid, typically a paraffin hydrocarbons or a vegetable oil which excludes air from the module and gives a predetermined overall buoyancy. Alternatively the cavity may be filled with an aqueous medium as previously described. One liquid is an SPC-process oil, available from Multisol Limited, based in England. These oils are restructured mineral oils having a very high purity and which have been dewaxed. They are water white, odorless, extremely stable and have substantially no aromatics that might attack other materials used in the module 10. Such materials have a density from 0.845–0.869 and kinematic viscosities as measured by ASTM D445 of between 3.35 and 35 centistokes at 40 degrees centigrade and between 1.31 and 5.6 centistokes at 100 degrees centigrade. Alternatively the cavity may be filled with a hydrocarbon paraffin such as ISOPAR M available from Exxon, or Shell SOL T.

The above described construction of streamer modules providing a compact streamer module which has a light chassis.

The principles, preferred embodiment, and mode of operation of the present invention have been described in the foregoing specification. This invention is not to he construed as limited to the particular forms disclosed, since these are regarded as illustrative rather than restrictive. Moreover, variations and changes may be made by those skilled in the art without departing from the spirit of the invention.

I claim:

1. A seismic marine streamer including hydrophones housed in elongate flexible tubes, only two load carrying rope members, a plurality of spacers which substantially fill the internal cross section of the tube, the internal void within the tube being filled by a liquid, the two load carrying rope members passing through each spacer on diametrically opposite sides thereof adjacent the outer peripheral margin of each spacer, and having a nominal diameter of at least 8 mm and a breaking load of at least 14,000 lbs. (6250 Kg), and wherein the rope members are each covered by a polyester fabric sheath.

2. A streamer as claimed in claim 1, wherein the spacers are each formed from a respective material having a particular relative density, the spacers being distributed along the streamer according to their respective densities to achieve a desired buoyancy characteristic.

3. A streamer as claimed in claim 2 wherein the spacers are molded plastic spacers formed from materials having densities in range of 0.5–1.8.

4. A streamer as claimed in claim 3 wherein the spacers are each made from one of polypropylene, polyacetal or polyurethane resin.

5. A streamer as claimed in claim 1, wherein each spacer has apertures therein through which the rope members and electrical cables pass, the apertures being located in the spacer to leave a cruciform load support in the center thereof.

6. A streamer as claimed in claim 1 wherein the load carrying rope members are formed from liquid crystal polymer fiber which is braided or twisted into rope.

7. A seismic streamer as claimed in claim 1 wherein the liquid is an aqueous medium.

* * * * *